Sept. 15, 1953 N. W. JACKSON 2,652,138
APPARATUS FOR FEEDING RODLIKE ARTICLES
Filed Nov. 21, 1949 5 Sheets-Sheet 1
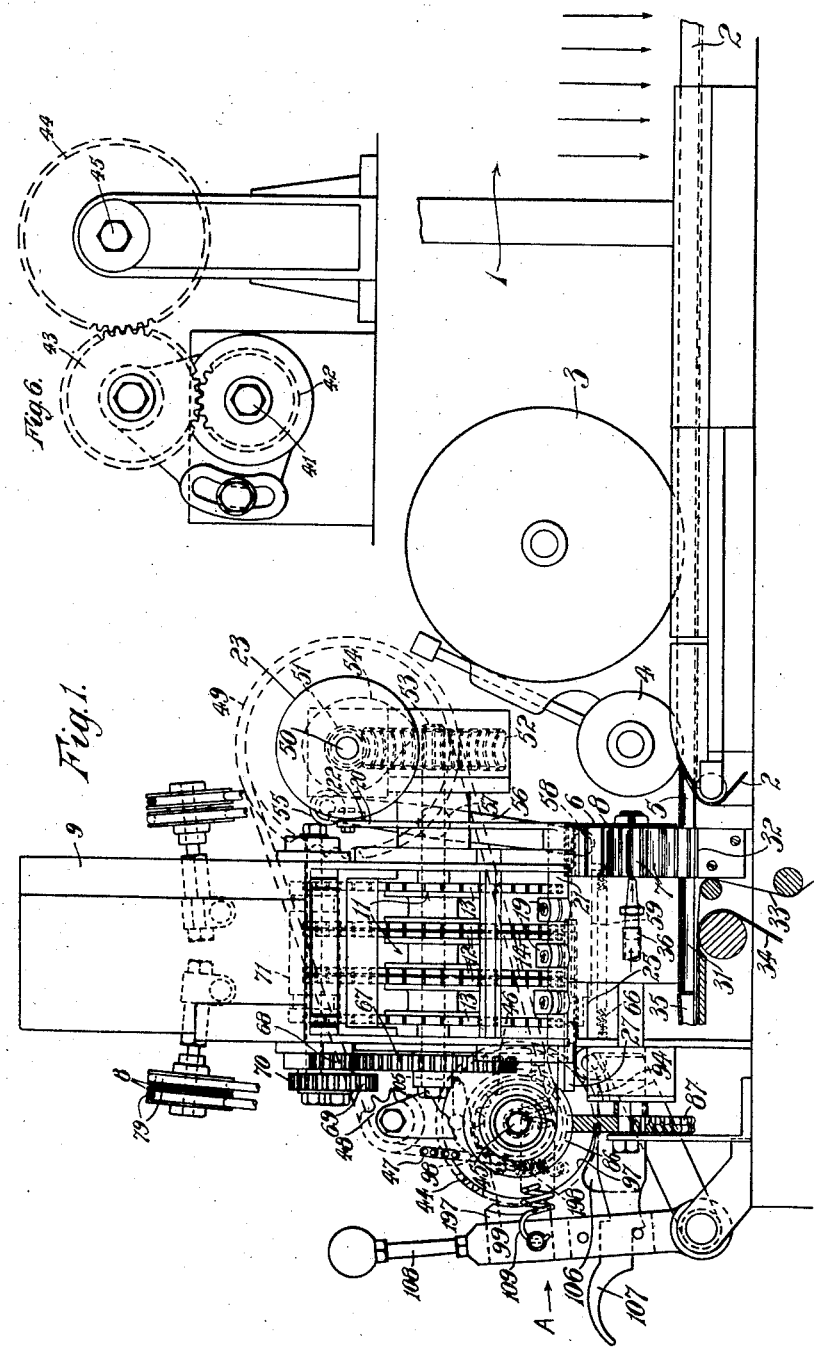
INVENTOR
n. w. Jackson
By Watson, Cole, Grindle + Watson Sept. 15, 1953 N. W. JACKSON 2,652,138
APPARATUS FOR FEEDING RODLIKE ARTICLES
Filed Nov. 21, 1949 5 Sheets-Sheet 2
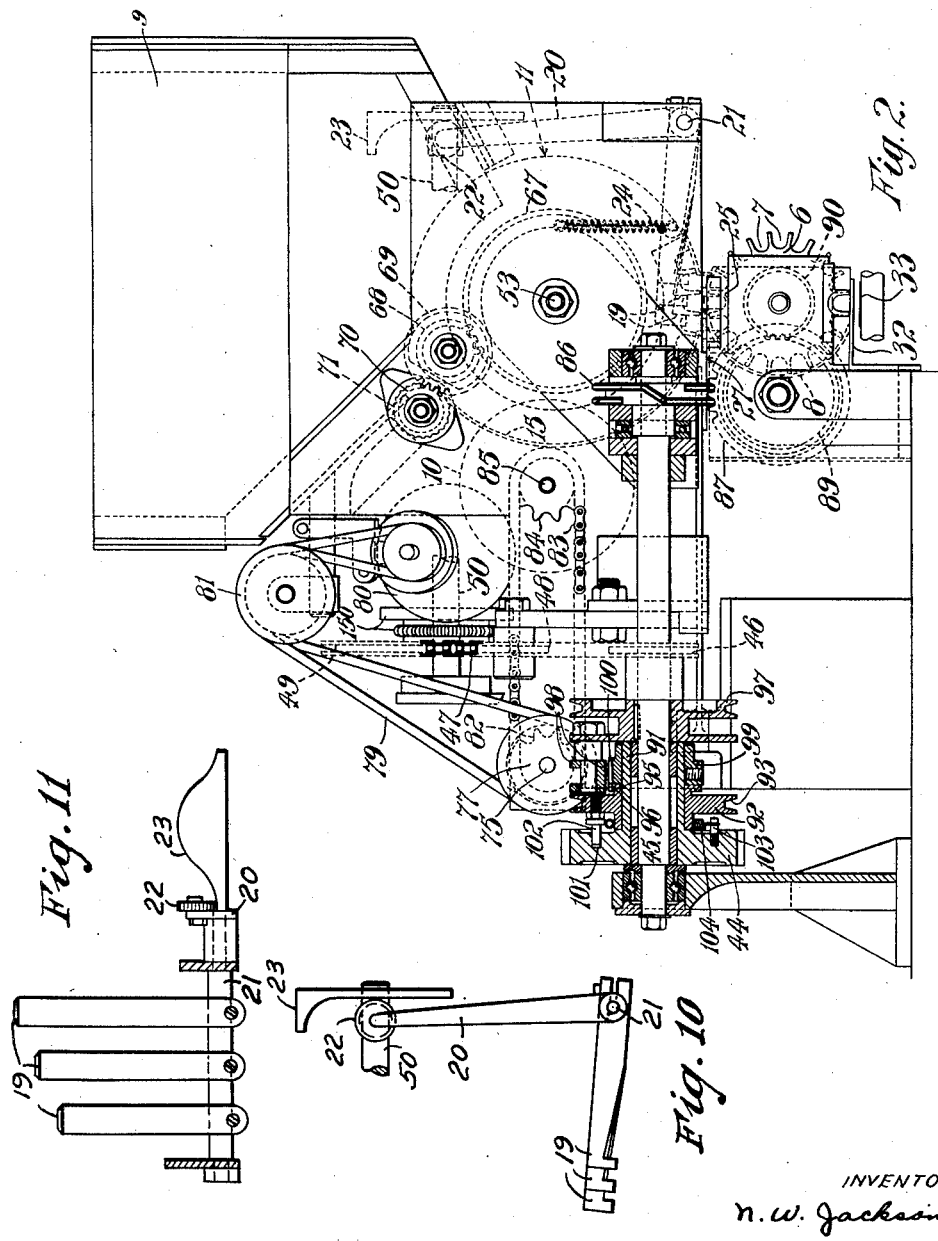
INVENTOR
N. W. Jackson
By Watson, Cole, Grindle & Watson

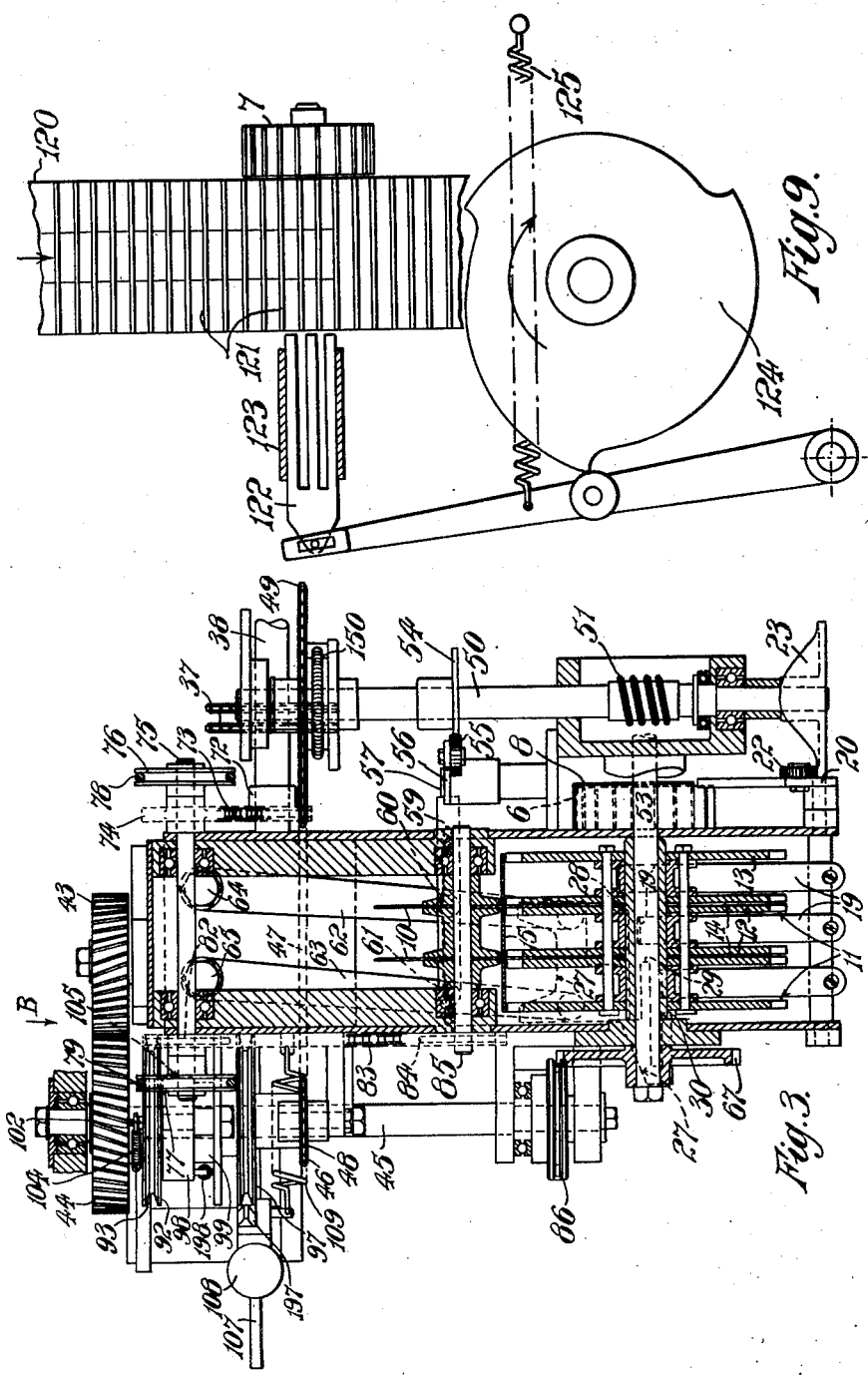

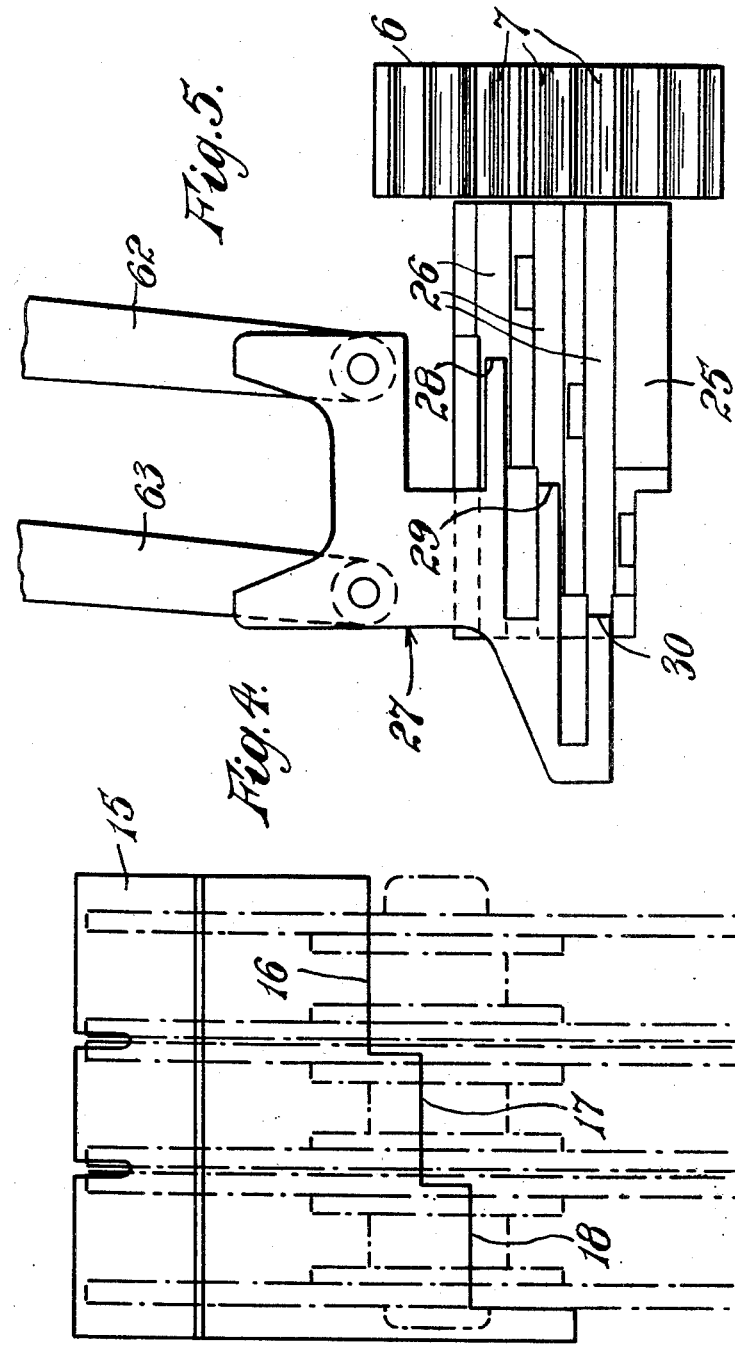

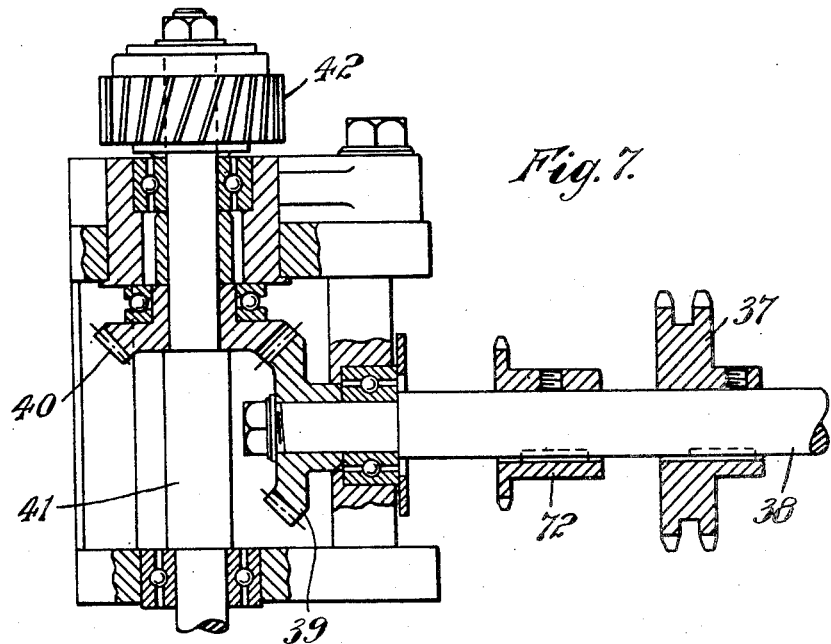
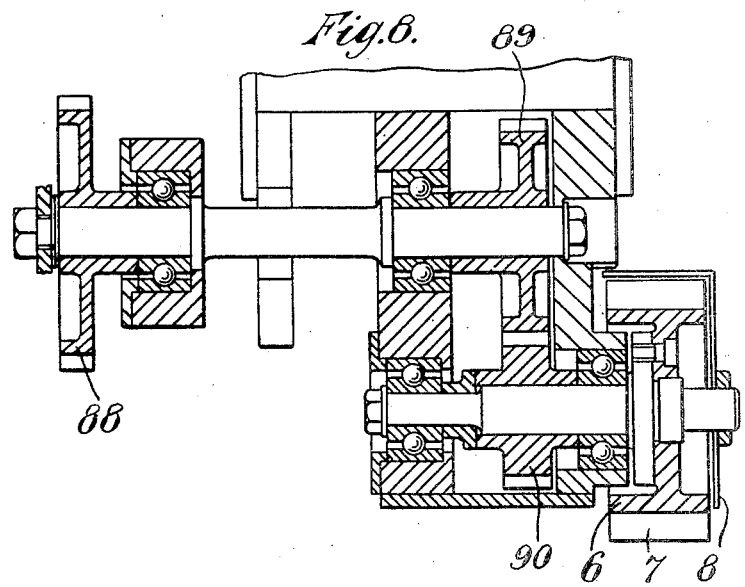

UNITED STATES PATENT OFFICE 2,652,138

APPARATUS FOR FEEDING RODLIKE ARTICLES

Norman Walter Jackson, Deptford, London, England, assignor to Molins Machine Company Limited, London, England, a British company Application November 21, 1949, Serial No. 128,528
In Great Britain December 3, 1948

9 Claims. (Cl. 198—32)

This invention concerns improvements in or relating to apparatus for feeding rod-like articles such as stubs for use in the manufacture of mouthpiece cigarettes. The word "stub" shall be taken to include any mouthpiece portion for mouthpiece cigarettes, such for example, as a plug made of crepe paper or like material.

In the manufacture of mouthpiece cigarettes it is sometimes required to feed stubs in a direction transversely of their lengths and in a single line considered in that direction, in order to deliver them one at a time for incorporation with one or more tobacco or cigarette portions to form mouthpiece cigarettes. In the specification of United States application Serial No. 119,468 there is described apparatus for manufacturing mouthpiece cigarettes in which an intermittently rotating drum is provided with peripheral flutes, each of which is adapted to contain a stub. The stubs are thus moved in a single line transversely of their lengths, and are brought one at a time into alignment with a tobacco filler which passes through each flute in turn and thereby ejects the stub.

The present invention is concerned with apparatus whereby stubs may be delivered to an intermittently moving member, such as a fluted drum as above mentioned, which carries the stubs in a single line.

It is often found convenient to employ multiple length stubs and to subdivide them, during the feeding operation, into a number of desired lengths, each of which constitutes a stub suitable for feeding and delivering as mentioned above. The multiple length stubs may be arranged on a conveyor such as a fluted wheel and moved transversely of their lengths, in parallel arrangement, and subdivided by cutting across their lengths. Thus it will be seen that the subdivided stubs are then arranged in parallel rows, of stubs in axial alignment each row consisting of the stubs which have been subdivided from one multiple length stub, and they can also be considered as being arranged in a number of parallel lines considered in a direction transverse to the lengths of the stubs, the number of such lines being, of course, the same as the number of stubs in a row. For convenience the expressions "row" and "line" shall be considered herein as having the meanings given above.

It is an object of the present invention to provide improved means for delivering stubs in a single line to an intermittently moving member such as a fluted drum as mentioned above, so as to enable the member to be moved at a higher speed.

According to the present invention, there is provided apparatus for delivering stubs to an intermittently moving member (e. g. a fluted drum) which conveys them in a single line, comprising a conveyor to hold stubs in parallel rows and in a plurality of parallel lines, said conveyor being arranged to move the stubs in a direction transverse to the lengths of the stubs, feeding means comprising a reciprocating pusher having pusher faces each of which is arranged on a forward stroke to engage one stub only from each of a number of consecutive rows to push such stubs axially towards the intermittently moving member a distance approximately equal to the length of a stub, succeeding pusher strokes causing stubs to move axially transversely of the direction of movement of the conveyor, whereby at each stroke of the pusher a number of stubs nearest to the intermittently moving member is delivered as a single line to the intermittently moving member.

The pusher may have stepped pusher faces each of which is arranged on each forward stroke to engage one stub only from each line and from each of a number of consecutive rows. Or the pusher may have a plurality of pusher faces in a plane and be actuated to move forward in steps equal in number to the number of lines, whereafter the pusher moves back to its original position in one stroke.

Further according to the present invention there is provided apparatus for delivering stubs to an intermittently moving member (e. g. a fluted drum) which conveys them in a single line, comprising a conveyor to hold stubs in parallel rows and in a plurality of parallel lines, said conveyor being arranged to move the stubs in a direction transverse to the lengths of the stubs, feeding means comprising a reciprocating pusher having stepped pusher faces each of which is arranged on each forward stroke to engage one stub only from each line and from each of a number of consecutive rows, which number is equal to the number of said lines the pusher being arranged at each forward stroke to push such stubs axially a distance approximately equal to the length of a stub, whereby at each stroke of the pusher a number of stubs nearest to the intermittently moving member, and equal to the number of said lines, is delivered as a single line to the intermittently moving member.

The feeding means may comprise a stationary support for stubs and means to transfer simultaneously from the conveyor to the said support one stub only from each line and from each of a number of consecutive rows which number is equal to the number of stubs in each row, the support being located aside said intermittently moving member and the pusher being arranged to engage and push said stubs as aforesaid to transfer stubs from the support to the intermittently moving member.

The means to transfer stubs from the conveyor to the support may comprise a plate co-operating with said conveyor to support stubs and having stepped edges whereby on each movement of the conveyor the stubs to be transferred can move over the stepped edges on to the support. Presser means may be provided to engage the stubs to be transferred and feed them positively as they move over the stepped edges, down on to the support. The said presser means may be arranged to control the said stubs on the support during their lengthwise movement across the support.

The support may be provided with grooves or channels in order to locate the transferred stubs and to guide them while they are being moved lengthwise by the pusher.

Apparatus according to the invention will now be described by way of example with reference to the accompanying drawings.

The apparatus for feeding stubs is shown and described herein when used on the machine for making mouthpiece cigarettes that is specifically described and shown in the specification of application Serial No. 119,468.

In the drawings:

Figure 1 is a front elevation of the apparatus and shows also a portion of the cigarette machine.

Figure 2 is a view of Figure 1 in the direction of the arrow A and partly in section.

Figure 3 is a plan of the apparatus shown in Figure 1 and partly in section.

Figure 4 is a view of a fragment of Figure 3 showing a shield in detail which is in section in that figure.

Figure 5 is a view of a fragment of Figure 3 showing the parts more clearly.

Figure 6 is a view of part of Figure 3 in the direction of the arrow B showing a few parts of the main drive.

Figure 7 is a view of a fragment of Figure 3 showing parts of the driving devices hidden in that figure.

Figure 8 is a view of a fragment of Figure 3 showing driving devices for the fluted drum, said devices being hidden in Figure 3.

Figure 9 is a diagrammatic view of a modified form of stub feeding apparatus.

Figures 10 and 11 are views of fragments of Figures 2 and 3 respectively and showing pressing members which are partly obscured in Figures 1 and 2.

Referring to the drawings, the machine, which closely resembles an ordinary continuous rod cigarette machine, is provided with a tobacco hopper 1 in which a shower of tobacco is caused to fall on an endless travelling band or tape 2 (hereafter referred to solely as a band) which forms the showered tobacco into a loose continuous tobacco filler.

As the remaining part of the machine, to which the apparatus illustrated is fitted, is in all respects an ordinary continuous rod cigarette making machine further description of the hopper is unnecessary as those skilled in the art will readily understand the showering of tobacco and the forming of it into a filler, as such operations are fundamental to any continuous rod machine.

The showered tobacco is conveyed by the band 2 and formed into a filler and compressed by compression wheels 3 and 4 into a moderately compact mass and in that state is fed through a guide tube 5 which terminates flush with the side of an intermittently rotating drum 6.

The thickness of the intermittently rotating drum 6 is approximately equal to the length of two stubs, as the usual practice in making cigarettes of this kind is to assemble alternate double lengths of tobacco filler and double-length stubs, enclose them in a paper wrapper and thereafter to cut the stub and tobacco portions midway to make two mouthpiece cigarettes. For clearness the double length stubs will be called hereafter "stub portions" and double lengths of tobacco filler will be called "filler portions."

The drum is provided with a number of flutes or grooves 7 on its periphery equally spaced and running parallel to its axis. The flutes are of the well-known shape commonly employed on drums for feeding cigarettes and other rod-like articles, see Figure 2, and the lowest flute, whenever the drum is stationary is in alignment with the guide tube 5.

Stub portions are fed into successive flutes of the drum at the upper side thereof in a manner described in detail later and when the drum is stationary the leading end of the tobacco filler passes through the guide tube 5 and along the lowest flute until, when the leading end is beyond the far side of the drum by an amount equal to a filler portion, the drum moves round one stage (i. e. one flute pitch) during which movement the continuous filler is sheared as described later so that the section lying in the drum flute is separated and removed from the rest and the stub portion in the succeeding flute is brought into position to occupy the space vacated by the removed section. A shield 8 covers the flutes from the stub portion receiving position to the flute before the one through which the filler passes, to prevent stub portions from falling out of the flutes.

At a suitable position above the drum and associated devices described there is fixed a hopper 9 in which stock lengths of stub material are deposited. The stock lengths of material are sufficient to provide six finished stubs and during the process of feeding lengths out of the hopper they are cut by rotatable knives 10 into three pieces each of which pieces constitutes a stub portion. The feeding operation may be carried out in any known way, for example, in the way in which cigarettes are fed out of a hopper by the employment of a fluted wheel in the flutes of which the stock lengths of material successively fall. This is the method illustrated and as seen in Figure 1 the wheel, generally indicated by the reference 11, is formed by a series of four spaced fluted discs so as to provide spaces in which certain devices referred to later may work. The middle discs 12 are twice the width of the outer discs 13 and are peripherally grooved at 14 to accommodate the two circular knife blades 10 which rotate and divide the stock lengths into three equal stub portions. An arcuate guide plate or shield 15 is provided around one side of the drum to cover the flutes and prevent stub portions from falling out of the flutes until it is desired to transfer them from the wheel. In the example illustrated the shield prevents the stub portions from leaving until they reach the bottom level of the wheel. The shield is stepped as shown in Figure 4, in any suitable manner to ensure that the three stub portions in a flute move out of it one after another. The three steps 16, 17, 18 shroud the wheel flutes so that the stub portions cut from one stock length fall into grooves 26 of a support 25 described later with reference to Figure 5 in alignment with pusher faces 28 and 29 and 30 shown therein.

It will thus be seen that the wheel conveys stubs transversely of their lengths, the stubs being arranged in the flutes in parallel rows each of which contains three axially aligned stubs, while considered transversely of the lengths of the stubs and in the direction of their movement, the stubs on the wheel are also arranged in three parallel lines. At the bottom level of the wheel the arcuate guide plate is stepped as above mentioned, to provide edges over which three stubs can fall, the stepped edges being arranged so that one stub from each of three consecutive rows, and from each of the three lines of stubs, can simultaneously fall from their respective flutes, when the wheel rotates to bring such stubs past the stepped edges. Thus it will be seen that the first stub from one row, the middle stub from the next row and the last stub from the next row are simultaneously carried past an edge of the guide plate and are able to fall from the wheel. Moving fingers or pressers 19 are arranged within the spaces between the fluted discs 12 and 13 and operated by any suitable mechanism to ensure that the stub portions move out of the flutes at the proper time and under proper control. The mechanism shown comprises a cam lever 20 fixed to a shaft 21 to which the ends of the pressers 19 are also fixed. The upper end of the cam lever 20 has a roller 22 on it which is drawn into engagement with a crown cam 23 by a spring 24, see Figure 2. Thus as the cam rotates, the operative ends of the pressers move up and down. The stub portions move down into a grooved support 25, Figure 5, whose grooves or channels 26 are in alignment with the three corresponding flutes 7 on the upper part of the drum 6 whenever the latter is stationary and they therefore fall into the grooves or channels of the support in a similar arrangement. As will be gathered from the description of feeding and cutting the stock lengths, the stub portions in the channels 26 are spaced by different distances from the drum 6. It is therefore necessary to move the stub portions in said grooves by different amounts to feed them into the drum flutes and this operation is performed in the following way:

A reciprocating pusher 27 is provided for pushing stub portions lengthwise along the grooves of the support and into the flutes of the drum 6. The pusher is stepped as shown in Figure 5 so as to have three separate pusher faces 28, 29 and 30 each of which is arranged, on a forward stroke of the pusher, to engage the end of a stub portion. It will be seen from the above description and Figure 4 that the three stub portions which are transferred on to the support at each movement of the wheel are arranged on the support in staggered formation. The stepped pusher is arranged to move, on each forward stroke, a distance approximately equal to the length of a stub portion, and thus at each stroke it moves each stub portion approximately one stub portion length forward. The stub portion nearest to the drum is thereby moved into a flute of the drum, while each of the other two stub portions is moved a stub portion length towards the drum 6. The movements of the various parts are so timed that whenever three stub portions are transferred in staggered formation on to the support, the pusher moves forward, and it will be seen that after the first three strokes, each stroke of the pusher will cause the three stub portions nearest to the drum to be moved endwise into three consecutive flutes of the drum.

The fluted wheel 11 by which the stub portions are conveyed moves one flute pitch for every three movements of the drum 6. Thus each time the pusher is operated there will be three empty drum flutes aligned with the grooves 26 of the stub portion support 25. It is therefore possible to convey and feed the stub portions at a relatively slow rate while at the same time the drum 6 may be rotated as rapidly as may be practicable, and thus a considerably increased speed in the manufacture of mouthpiece cigarettes may be obtained.

At the far side of the drum 6 there is a further guide 31 and beneath the lowest flute there is a filler support consisting of a thin fixed strip 32 or a roller, whereby the continuous filler is supported in the flute. The guide 31 is not a tube but is of inverted U shape in cross-section and the far end is flared laterally. As shown in Figure 2 the strip 32 is a wide strip but it is easy to see that the filler supporting part of the strip may be fairly narrow so that dust and shorts can fall away, the precise arrangement adopted depending on the degree to which the filler is compressed before it passes into the first guide tube.

As the drum rotates, the portion of the tobacco filler contained in the lowest flute, which is at that moment in alignment with the continuous tobacco filler, is severed therefrom since the two guides 5 and 31 are very close to the sides of the drum and movement of the latter causes the tobacco to be sheared. The ends of the guides adjacent the drum may if desired be formed as blocks of considerable area to assist in the shearing action and subsequent control of the sheared portion. The action is not precisely a cutting action but the sections are removed from the continuous tobacco filler leaving the filler portion ends sufficiently clean for the purpose in view. As the flute in alignment with the filler moves out of line therewith, the succeeding flute, which contains a stub portion as previously explained, is brought into that position and as the drum comes to rest the compressed leading end of the filler moves through the guide tube 5 and pushes the stub portion out of the flute and passes through the flute itself. As soon as the filler has moved the necessary distance the drum moves again, and the operation described is repeated.

The further guide 31 leads the filler portions and stub portions on to a paper web 33 on an endless band 34 which is the endless band or tape on which a continuous cigarette rod is made on continuous rod machines and which is hereafter referred to solely as a tape.

In this manner the cigarette paper web 33 which is carried on the rod forming tape 34 of the machine becomes loaded with alternate stub portions and filler portions and the rod forming tape carries them through the usual rod forming mechanism part of which is indicated at 35 where the paper is folded over, gummed and sealed and the resulting rod is thereafter cut into cigarettes each provided with a plug or other mouthpiece.

As soon as a flute containing a removed section of filler is clear of the continuous tobacco filler and its conveyor and other devices the removed section falls out of the flute, or may be positively removed, whereafter the flute is cleaned by an air blast from a nozzle 36 or a brush so that when it once more receives a stub portion there are no fragments of tobacco present which might later on become trapped between the stub portion and the cigarette paper wrapper. Moreover by passing the filler through the lowest flute of the drum any shorts are free to fall away past the filler support 32 which supports the filler in the flute if the support is made suitably narrow.

It is not always necessary to provide special mechanism for cleaning the flutes as the apparatus described can, on a suitable cigarette machine, be driven at a very high speed in which case the centrifugal force is sufficient to fling any particles of tobacco remaining in a flute clear of the drum.

It will be appreciated that the fluted drum is liable to severe wear on the flute edges where the shearing of the continuous filler takes place and to overcome this and to assist in clean separation of the filler, hardened insets may be provided. These may be in the form of radial strips fixed to the tooth-like portions between successive flutes. Materials such as hardened steel or any alloys such as are used for cutting tools may be used for the insets. It does not appear to be necessary to illustrate these items.

The remaining details of the apparatus will be referred to in the following description of the driving devices. A sprocket wheel 37 Figures 3 and 7 is driven from any suitable part of the cigarette machine for example from the hopper driving mechanism and drives a shaft 38. A bevel gear wheel 39 fixed on the shaft 38 drives another bevel gear wheel 40 on a shaft 41. The end of this shaft which is shown broken is used to drive other parts of the cigarette machine and is of no further interest. A gear wheel 42 is fixed on the shaft 41 and as shown in Figure 6 this wheel drives a further gear wheel 43 which drives a slightly larger gear wheel 44, these gear wheels 43 and 44 being also shown in Figure 3. The gear wheel 44 is mounted on a shaft 45 in a special manner as will be described later.

A sprocket wheel 46 also mounted on the shaft 45 has a chain 47 on it which after passing over an idler sprocket wheel 48 drives a larger sprocket wheel 49 which is mounted on a shaft 50 and coupled thereto by an overload clutch 150.

This shaft 50 has fixed thereto a worm 51 which drives a wormwheel 52 fixed on a shaft 53 on which the aforesaid fluted feed wheel 11 is mounted. The crown cam 23 is also mounted on the shaft 50. A disc cam 54 fixed on the shaft 50 engages a roller 55 at the end of a cam lever 56 pivoted at 57. The lower end of the lever 56 is pivoted at 58 to a link 59 which is pivoted at 60 and 61 to levers 62 and 63 which are pivoted to a frame of the apparatus at 64 and 65. The free ends of these levers, as best seen in Figure 5, are pivoted to the reciprocating pusher 27. The return of the pusher is effected by a spring 66 Figure 1 and thus the stubs are fed towards the fluted drum 6 at the proper times.

At the end of the shaft 53 remote from the wormwheel 52 is a gear wheel 67. This drives a small gear wheel 68 to which is fixed a larger gear wheel 69. The latter drives a small gear wheel 70 and through this compound gear train a small roller 71, which is fluted or serrated as shown in Figure 2 is driven to assist the passage of stock lengths into the flutes of the wheel 11, in the known manner.

On the shaft 38, Figures 3 and 7, there is also a small sprocket wheel 72. This is connected by a chain 73 to a similar sprocket wheel 74 fixed to a spindle 75 journalled in the frame of the apparatus as shown in Figure 3. At its ends this spindle has pulleys 76 and 77 fixed to it and from each pulley round belts 78 and 79 respectively drive grinding wheels for sharpening the knives 10.

The drive for one knife grinder 80 is clearly shown in Figure 2 where the belt 79 passes over idlers 81 and the other drive is identical. On the spindle 75 is also fixed a small sprocket wheel 82 which has a chain 83 on it passing round a further sprocket wheel 84. The latter is fixed on a spindle 85, journalled as shown in Figure 3 on which the rotary knives 10 are fixed.

The drum 6 is driven by a worm 86, the thread of which engages with a worm wheel 87 geared to the drum by gear wheels 88, 89 and 90, Figure 8, but the major portion of the worm is of zero lead, see Figure 2, so as the worm rotates, the drum moves while the helical part of the worm thread is engaging with the wormwheel and stops when the part of zero lead comes into engagement with the wormwheel.

The worm is driven from the gear wheel 44 but interposed between the gear wheel and its shaft 45, to which the worm is fixed is a clutch device which will now be described.

The hub of the gear wheel comprises a long sleeve 91 rotatable on the shaft 45 which is rotatably mounted in bearings as shown in Figure 2.

Part of the sleeve 91 forms a journal for a disc or wheel 92 whose rim is adapted to form part of a brake so that when a shoe is applied to the rim, the wheel is slightly checked in its rotation as will be more fully explained later. A convenient arrangement is, as illustrated, a V groove 93 in the rim of the wheel 92 and a brake shoe 94, Figure 1 of V section. The wheel 92 has a hub 95 on the periphery of which is a single ratchet tooth 96. Coaxial with this wheel is another wheel 97 whose rim is also of V section and a brake shoe 197 is also provided to engage this rim at times. The second wheel 97 is keyed to the shaft, see Figure 2, and thus is coupled to the drum 6.

On the second wheel 97 is a pivoted pawl 98 whose end is drawn into engagement by a spring 199 with a ring 99 which is keyed to the gear hub 91 and has a single ratchet tooth 100 on it. Thus when the gear 44 rotates and the pawl 98 is in engagement with the ring tooth 100, the wheel and the worm all rotate with the gear 44. The gear wheel has a quadrant shaped slot in it at 101 into which a pin 102, fixed in the neighbouring side of the first wheel 92, projects. Between said pin and another pin 103 on the gear wheel is a tension spring 104 which bends around the gear hub and tends to pull the first said pin around the quadrant slot. Normally, i. e. when apparatus is working, the rear end of the quadrant slot is in driving engagement with the pin 102.

The pawl 98 is wide enough to extend across the ring tooth 100 and the wheel tooth 96 and it is only when these two teeth are in alignment that the pawl can enter into driven engagement with the tooth-ring.

A device is provided for tripping the pawl when it is desired to stop the drum. For this purpose the pawl has a tail 105 and an abutment 106 fixed to a lever 107 can be moved thereby to intercept the tail as the second wheel 97 rotates, and disengage the pawl. The lever 107, as seen in Figure 1, also forms a stop for a bell crank lever 108 which carries the brake shoes 94 and 197 and is spring urged by a strong spring 109. When lever 107 is lifted to cause the abutment 106 to intercept the pawl tail the lever 108 moves about its pivot and the shoe 197 engages the rim of wheel 97 slightly before the lever 107 has moved far enough for the pawl 98 to be tripped, so that the pawl is tripped while the brake is on and the second wheel is instantly arrested and thus the worm and the drum and intervening gears are all stopped.

As soon as the pawl is tripped the restraint exercised by the pawl tooth engaging with the wheel tooth 96 ceases and the first wheel 92 moves forwards on the gear hub, 91 (i. e. it advances with respect to the gear) under the pull of the spring 104. Thereafter the gear wheel 44 and first wheel 92 continue to rotate together with the pin 102 in the forward end of the quadrant slot.

When it is desired to restart the drum, the lever 108 is moved in the reverse direction against the tension of the spring 109. This causes the brake shoe 94 to be applied to the first wheel 92 so that it is retarded and the spring 104 is stretched as the pin 102 moves backwards in the quadrant or driving slot. The lever movement simultaneously releases the brake shoe 197 on the second wheel 97 and permits the lever 107 to drop to the position shown in Figure 1 and the pawl 98 to pivot towards the position where it engages with the tooth 100. This engagement cannot take place until the tooth 96 on the first wheel is in alignment with the ring tooth 100 and at the instant of alignment the pawl springs in and all the parts move in time with the gear thus preserving the original timed relationship of the parts.

As soon as the whole device is in operation again the pull on the lever 108 is relaxed and the shoe 94 is removed from its wheel. The pawl engaging abutment may be adjustable so that pawl tripping can take place at any desired position of the pawl as it rotates with its wheel.

A cigarette machine embodying the device is operated in the following manner. At the starting of the machine the clutch device just described is operated so that the drum is stationary. When the tobacco filler is satisfactory and a wrapped rod can be formed and broken off in the customary manner, or even cut into cigarettes if desired, the clutch handle is operated to start the drum, and mouthpiece cigarettes are produced. When for any reason, it is desired to stop the machine the lever 107 is raised and the clutch handle 108 is urged by its spring 109 to stop the drum whereafter a continuous tobacco filler passes through the drum and the resulting wrapped rod can be broken off or cut up as desired. As soon as the drum stops, the machine may be stopped and such parts of the rod which have been made in the interval between the two movements removed from the normal produce of mouthpiece cigarettes. If desired the lever 107 and machine starting handle may be interlocked so that the machine handle cannot be operated to stop the machine until the lever has been manipulated and the lever cannot be moved first on restarting the machine.

It will be seen that in a machine constructed according to the invention the stub portions could be delivered into the drum flutes by a lateral movement e. g. by dropping bodily into the flutes, and this movement can be effected much more quickly than the axial movement necessary to push a stub portion into a hole in the drum as on existing machines. Or, if it is expedient to move the stub portions axially they can be moved much more easily into wide flutes than into small holes. Similarly the removed section of filler can move out of a flute laterally. Thus both actions are quicker than those in existing machine. The flutes are also easily cleaned by mechanical devices if necessary. Thus owing to the rapid method of feeding stub portions and discarding tobacco sections the drum can move at a very high speed which not only increases the output but has the further advantage that the forward movement of the continuous filler is scarcely impeded during the very short intervals during which the drum is still.

In the construction shown in Figure 9 the drum 7, which rotates intermittently as in the previous case, is supplied with stubs from a conveyor band 120 which has troughs 121 thereon as shown to convey the stub portions in three lines, each row comprising three portions. A toothed pusher 122 having three pusher faces in a plane is movable in a guide 123 by a cam 124 and spring 125 to transfer a line of stubs from three rows at a time to the drum. As the drum flutes are large it is possible to feed stubs in this manner from a flat conveyor but it will be appreciated that if it is desired to feed from more than three rows at a time the conveyor may be a drum or the conveyor band may be curved at the feeding position by supporting it on a wheel. The pusher moves in one-third of its feeding stroke while the drum is stationary and feeds three stubs thereto. The drum makes three movements and then the pusher moves forwards again to feed three more stubs. These movements are repeated and then the pusher moves back to its original position ready for the next forward stroke.

In an alternative construction the stubs, instead of first being transferred on to a support, may be fed directly from the fluted conveyor wheel into the flutes of the drum, in which case the support is omitted and the arcuate guide plate is continued beneath the wheel to support the stubs, while the stepped pusher is arranged to extend between the conveyor wheel and the guide.

What I claim as my invention and desire to secure by Letters Patent is:

1. In stub-feeding apparatus, a conveyor for conveying stubs in parallel rows and in a plurality of parallel lines, and in a direction transverse to their lengths, and transfer means comprising a reciprocable pusher which is arranged to move in the direction of the lengths of the stubs, and which is stepped so as to provide a plurality of pusher faces, equal in number to the said plurality of lines, wherein the said pusher is arranged to move in a feeding stroke a distance substantially equal to the length of a stub so as at each feeding stroke to push stubs lengthwise and thereby cause a plurality of stubs, equal in number to said plurality of lines, to be delivered at each feeding stroke to a further conveyor which conveys the stubs in a single line, and wherein before each said feeding stroke, forward movement of the first said conveyor causes a plurality of stubs equal in number to said plurality of lines to be fed toward the transfer means, wherein the distances of the pusher faces one behind the other are such that before each feeding stroke each stub so fed is engageable by a separate pusher face.

2. Apparatus for delivering stubs to a movable member which conveys them in a single line, comprising a conveyor to hold stubs in parallel rows and in a plurality of parallel lines, said conveyor being arranged to move the stubs in a direction transverse to their lengths, a support located adjacent said movable member and arranged to receive stubs from said conveyor, means to transfer simultaneously from the conveyor to the support one stub only from each line and from each of a number of consecutive rows, which number is equal to the number of stubs in each row, the stubs being laterally displaced on said support, and a reciprocable pusher which is arranged to move in the direction of the lengths of the stubs, and which comprises a plurality of pusher faces, equal in number to the number of stubs in a row, and arranged to move in a feeding stroke a distance substantially equal to the length of a stub and at each feeding stroke to engage the laterally displaced stubs and to push them lengthwise toward the said movable member, whereby on each feeding stroke a number of stubs nearest to the movable member, and equal to the number of lines, is delivered from the support as a single line to the movable member.

3. Apparatus as claimed in claim 2 wherein the means to transfer stubs from the conveyor to the support comprises a plate cooperating with said conveyor to support stubs and having stepped edges whereby on each movement of the conveyor the stubs to be transferred can move over the stepped edges on to the support.

4. Apparatus as claimed in claim 3, comprising presser means adapted to engage the stubs to be transferred and feed them positively as they move over the stepped edges, down on to the support.

5. Apparatus as claimed in claim 4, wherein the support is provided with grooves or channels in order to locate the transferred stubs and to guide them while they are being moved lengthwise by the pusher.

6. Apparatus for delivering stubs to a movable member which conveys them in a single line, comprising a conveyor to hold stubs in parallel rows and in a plurality of parallel lines, said conveyor being arranged to move the stubs in a direction transverse to their lengths, a support located adjacent said movable member and arranged to receive stubs from said conveyor, means to transfer stubs from said conveyor to said support, a reciprocable pusher to deliver stubs lengthwise from said support to said movable member, wherein said pusher comprises as many separate pusher faces as there are stubs in a row, the said faces being arranged so as each to be engageable with one of a number of stubs transferred to the support which stubs are offset from each other lengthwise by at least a stub length and laterally by at least the width of a stub, and wherein the said pusher is arranged to move in a feeding stroke a distance substantially equal to the length of a stub so as to move each stub on the support one stub length toward the movable member and thereby at each feeding stroke to cause a number of stubs equal to the number of said pusher faces to be delivered as a single line to the movable member.

7. Apparatus as claimed in claim 6 wherein the means to transfer stubs from the conveyor to the support comprises a plate co-operating with said conveyor to support stubs and having stepped edges whereby on each movement of the conveyor the stubs to be transferred can move over the stepped edges on to the support.

8. Apparatus as claimed in claim 7 comprising presser means adapted to engage the stubs to be transferred and feed them positively as they move over the stepped edges, down on to the support.

9. Apparatus as claimed in claim 8, wherein the support is provided with grooves or channels in order to locate the transferred stubs and to guide them while they are being moved lengthwise by the pusher.

NORMAN WALTER JACKSON.

References Cited in the file of this patent

UNITED STATES PATENTS

| Number | Name | Date |
| --- | --- | --- |
| 2,090,129 | Kimball et al. | Aug. 17, 1937 |
| 2,150,596 | Bingham | Mar. 14, 1939 |